Feb. 24, 1948.  R. C. LOCKE  2,436,655
DIRECTIVE RADIANT ENERGY LOCATING AND INDICATING SYSTEM
Filed Nov. 16, 1942  2 Sheets-Sheet 1
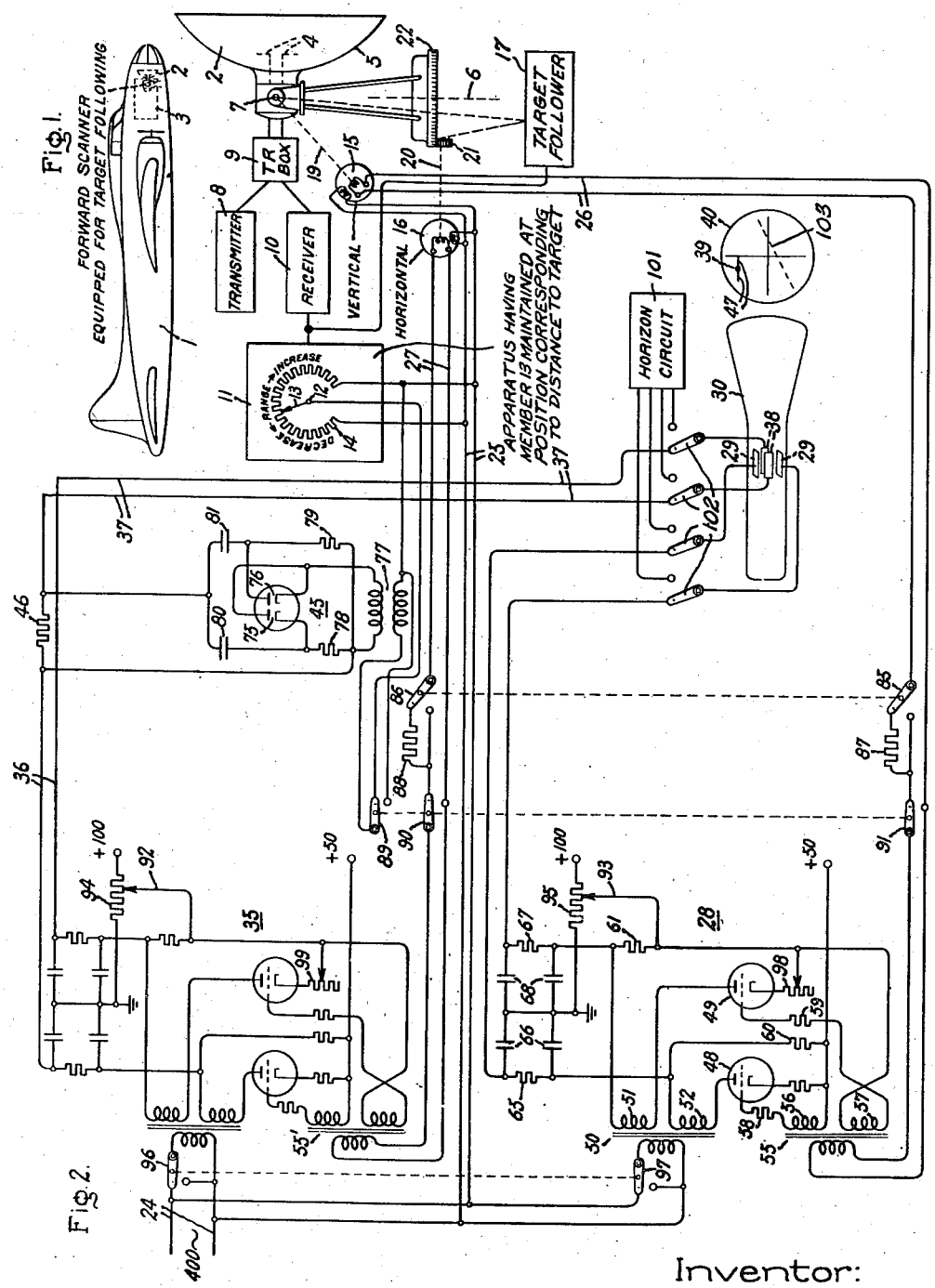
Inventor:
Raymond C. Locke,
by Harry E. Dunham
His Attorney.

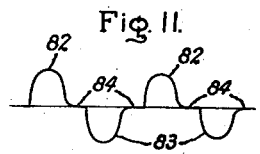
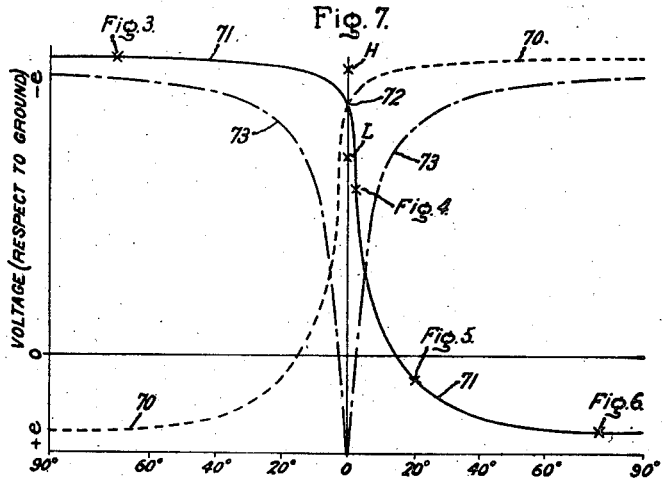
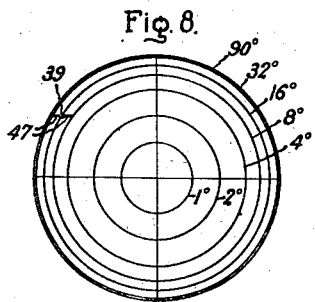
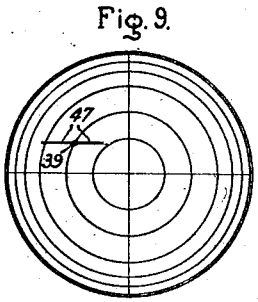
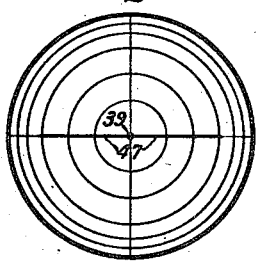
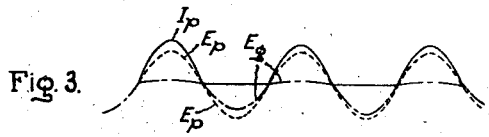
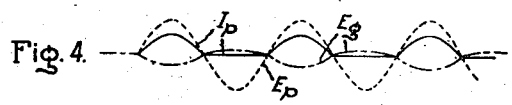
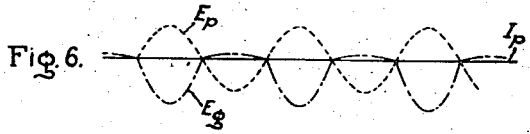
Inventor:
Raymond C. Locke,
by Harry E. Dunham
His Attorney.

Patented Feb. 24, 1948

2,436,655

UNITED STATES PATENT OFFICE 2,436,655

DIRECTIVE RADIANT ENERGY LOCATING AND INDICATING SYSTEM

Raymond C. Locke, Schenectady, N. Y., assignor to General Electric Company, a corporation of New York Application November 16, 1942, Serial No. 465,662

14 Claims. (Cl. 343—7)

My invention relates to directive radiant energy apparatus, and while not limited thereto, pertains more particularly to such equipment carried by moving craft.

One of the objects of my invention is to provide improved means for indicating the direction and range of any remote source from which radiant energy is received.

In copending application, Serial No. 478,994 of Anthony G. Linowiecki and Richard W. Porter, filed March 13, 1943, entitled Directive radio systems, and which is assigned to the same assignee as my present application, is described and claimed a directive radio echo apparatus adapted to be carried by an aircraft, for example, and which is provided with means for automatically scanning an area in advance of the craft. The equipment comprises a directive antenna arranged to radiate high intensity radio pulses and to receive corresponding pulses from remote objects by reason of reflection therefrom or by reason of the operation of apparatus carried thereby. Of course, if there be no such object in the area scanned, and no other source of radiant energy to which the equipment responds, the scanning operation continues and the pilot is aware that no other craft or obstruction lies in the forward vicinity of his craft. If there be such an object, or source, in the vicinity scanned, then the equipment responds to such energy received therefrom, the scanning operation is automatically discontinued, and the directive antenna is automatically directed or oriented at such remote object, or source, and is maintained in such orientation irrespective of the direction of travel of the craft. Means whereby such latter operation is secured is described and claimed in copending application of Sidney Godet, filed October 8, 1941, Serial No. 414,126, entitled Direction radio system, now Patent 2,412,612, issued Dec. 17, 1946, and which is assigned to the same assignee as my present application.

An object of my present invention is to provide improved means for indicating to the pilot the direction relative to his own line of travel of the remote object or source to which his equipment is responding and also to indicate the approximate range of such object or source.

Another object of my invention is to provide such improved means whereby information as to direction of the remote object relative to the direction of travel of the craft, and range of the remote object, or source, may be had by the pilot by a quick glance at a single instrument and whereby the accuracy of information as to direction is increased in the directions approaching the direction of movement of the pilot's craft.

I contemplate my invention particularly for use on aircraft, in which application the remote object, or source, is usually another aircraft. It is desirable in such application that the indication be one which produces the visual impression of an aircraft. Such an indication may be produced by a spot moving over the viewing screen of a cathode ray device in accord with the relative movement of the observed and observing crafts, said spot having oppositely projecting arms, or wings, suggestive of the wings of the observed craft.

An object of my invention is to provide improved means for producing such an indication together with means whereby the accuracy of the indication is increased as the direction of the remote object approaches the direct line of travel of the craft.

Another object of my invention is to provide improved means for varying the length of the wings of the indicative spot on the viewing screen as the range to the remote object lessens thereby to impress the pilot with the approach of the remote craft.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an aircraft carrying mechanism equipped in accordance with my invention; Fig. 2 represents circuits in accordance with my invention; Figs. 3 to 6 represent certain voltage and current relationships pertaining to that portion of Fig. 2 designated at 28 and 35; Fig. 7 represents certain further voltage relationships resulting from the relationships represented in Figs. 3 to 6; Figs. 8 to 10 represent the indications produced in accordance with my invention; and Fig. 11 represents voltage pulses generated by apparatus 45 of Fig. 2.

Referring to Fig. 1 of the drawing, I have represented at 1 a moving craft, which may be considered to be an aircraft, provided with a radio scanning mechanism 2. This equipment may be provided with means represented by the rectangle 3, whereby it is adapted to scan the area in advance of the craft with a beam, for example, of radio pulses and to receive such pulses from any remote object in the forward vicinity of the craft either by reason of reflection from such remote object or by reason of the operation of apparatus carried by such remote object. In this specification and the appended claims I shall refer to any such received pulses as echoes of the radiated pulses. The equipment 3 also includes means whereby when radiant energy from a remote object is received, the equipment immediately discontinues the scanning operation and maintains itself directed, or oriented, toward such remote object. The presence of such equipment is indicated on the drawing by the legend "Forward scanner equipped for target following" which appears near Fig. 1 and by the block 17 bearing the legend "Target follower" in Fig. 2. The block 17 represents equipment responsive to signals in receiver 10, Fig. 2, capable of orienting mechanism 2, Fig. 2, about axes 6 and 7 until the remote object lies on the axis of orientation of mechanism 2. The details of such target following, or automatic tracking, apparatus form no part of the present invention. For further information on a suitable apparatus for this purpose, reference may be made to above-mentioned Godet Patent 2,412,612.

My present invention has to do with indicating equipment associated with the equipment 3 of Fig. 1 whereby the pilot is advised of the direction of the remote object toward which the scanning mechanism is automatically oriented and of the distance to such remote object.

Fig. 2 represents in detail the circuits provided in accord with my invention. At the right of Fig. 2 is illustrated the scanning mechanism 2 of Fig. 1, this mechanism comprising, for example, a suitable antenna 4 arranged within a parabolic reflector 5, which may suitably be mounted for rotation both about a vertical axis 6 and about a horizontal axis 7 and which may be power driven about such axes through means not shown in Fig. 2. The details of such power driving means comprise no part of my present invention and are illustrated and described in the application and patent above referred to. The equipment comprises a transmitter 8 for generating radio pulses which are supplied through apparatus 9 to the antenna 4 for radiation thereby, and with a receiver 10 whereby pulses received on the antenna 4 are translated and supplied to equipment 11.

The equipment 9 may comprise the usual, so-called TR box, whereby the receiver is protected against the intense pulses produced by the transmitter, and pulses received from the antenna 4 are prevented from being objectionably attenuated by circuits associated with the transmitter.

The equipment 11 may be such that it responds to the time interval between any outgoing pulse and the subsequent received pulse, or echo, thereby to produce an operation in accord with the range to the remote object from which the received pulses arrive. This operation may comprise the positioning in rotation of a shaft 12 on which is carried an arm 13, which rotates over a resistance 14 in accord with the range, or distance, to the remote object. Thus, for example, if the duration of the time interval between an outgoing impulse and its received echo increases, as occurs if the range to the remote object increases, the arm 13 is rotated to the right as indicated by the legend "Increase" on the drawing. If the time interval lessens, as in the case when the range reduces, then the shaft 12 turns to the left as indicated by the legend "Decrease." The particulars of the means whereby this operation is secured form no part of my present invention and will not be described herein. One such means is shown in British Patent 497,147.

The scanning mechanism 2 is also provided with transformers 15 and 16, having rotating secondary windings arranged to be positioned in accord with the position of the scanning mechanism 2 about the respective horizontal and vertical axes 6 and 7. The mechanical connection of the secondary winding of transformer 15 with the horizontal axis 7 is indicated by the dotted line 19 and the connection between the secondary winding of device 16 and the vertical axis 6 is indicated by the dotted line 20 and the gears 21 and 22. These transformers 15 and 16 have stator windings, which are supplied with alternating electromotive force of any desired frequency, but which may be 400 cycles, for example, over a circuit 25 from a suitable source connected to the terminals 24. Each of these devices is adapted to produce across its secondary winding, or output circuit, namely, the circuit 26 in the case of the transformer 15, and the circuit 27 in the case of the transformer 16, a voltage having zero value when the scanning mechanism 2 is directed along the line of travel of the craft and which increases in value as the scanning mechanism deviates from the line of travel of the craft in the respective plane, this voltage having a certain phase if the deviation be in one direction and opposite phase if the deviation be in the opposite direction. The transformers may be of any suitable construction but desirably are of a form commonly used in self-synchronous systems and known as "selsyns."

This alternating voltage from the vertical transformer 15 is supplied over the circuit 26 and through a rectifying mechanism 28 to the vertical deflection plates 29 of a cathode ray oscillograph 30 thereby to control the deflection in the vertical direction of the cathode ray of this apparatus. Similarly the alternating voltage from the output circuit 27 of the horizontal transformer 16 is supplied over the circuit 27 and through rectifying mechanism 35 and circuits 36 and 37 to the horizontal deflecting plates 38 of the cathode ray device 30 thereby to control the horizontal deflection of the cathode ray of this device. The operation of the rectifying mechanism 28 and 35 will presently be explained, but the effect of these two voltages is to cause the deflection of an illuminated spot, such as that indicated at 39 in the circle 40, which circle represents the viewing screen of the oscillograph, over the viewing screen of the cathode ray apparatus in accord with the direction of the remote object from which echoes are received.

The potentiometer 13, 14, previously referred to, is utilized to control the intensity of alternating voltage supplied from the circuit 25 to a further rectifying and wave shaping apparatus 45, the operation of which later will be described, but which operates to produce across the resistance 46 pulses of voltage, which are superposed upon the unidirectional voltage supplied to the horizontal deflection plates 38 of the oscillograph thereby producing horizontal deflections of the cathode ray, which result in the horizontal projections 41 in length proportional to controlled intensity from the spot 39, which appears upon the viewing screen, these projections being suggestive of the wings of the observed craft.

The rectifying mechanism 28 comprises a pair of electron discharge devices 48 and 49 each having an anode, a cathode and a control electrode.

Alternating voltage for the operation of these devices is supplied thereto from the source 24 through transformer 50. This transformer has two secondary windings 51 and 52, the winding 51 being connected between the anode and cathode of the device 49 and the winding 52 being connected between the anode and cathode of the device 48, these windings being poled to supply voltage to these anodes in phase.

Voltage from the vertical transformer 15 is supplied through circuit 26 and transformer 55 to the control electrodes of the discharge devices 48 and 49. This transformer 55 has two secondary windings 56 and 57, the winding 56 being connected between the cathode and control electrode of device 48 through a relatively high resistance 58 and the winding 57 being connected between the cathode and control electrode of device 49 through a relatively high resistance 59, these windings 56 and 57 being poled to supply voltages to the two control electrodes in opposite phase relation.

Thus the voltage, which is supplied to the control electrode of one, or the other, of the two devices 48 and 49 at any instant, is in phase with the anode voltage while that supplied to the control electrode of the other device is in opposite phase with the anode voltage. If the control electrode and anode voltages of either of these devices be in phase, pulses of anode current flow in the respective discharge device having a value determined substantially by the anode voltage. This is because when the control electrode becomes positive current flows therein and through the resistance 58 or 59, as the case may be, of such value that the control electrode becomes only minutely positive with respect to the cathode during the period when the anode is positive and irrespective of the value of induced voltage in 56 or 57, as the case may be. If the voltage on the control electrode be in opposed phase relation with the voltage supplied to the anode, that is, if it be negative when the anode is positive, then it tends to reduce the current pulses in the plate circuit in accordance with induced voltage in 56 or 57. These current pulses flow through resistances 60 and 61, respectively, connected in the anode circuits of the discharge devices. The voltage on the resistance 60 is supplied through a resistance 65 to the upper plate of the vertical deflection electrodes 29, the opposite terminals of the resistance 65 being connected to ground through condensers 66 for smoothing purposes. Similarly the voltage on resistance 61 is supplied to the lower electrode of the vertical deflection electrodes 29 through a resistance 67 the opposite terminals of which are connected to ground through smoothing condensers 68. These filters comprising the resistance 65 and condensers 66, and the resistance 67 and condensers 68 operate to smooth out the pulses of electromotive force appearing on the resistances 60 and 61 and to supply a comparatively steady unidirectional voltage between the vertical deflection plates of the cathode ray device.

The operation of the rectifying apparatus 35 is exactly the same as that described in connection with the rectifying apparatus 28 but it responds to an alternating voltage derived from the horizontal transformer 16 and produces a steady unidirectional voltage which is supplied to the horizontal deflection plates 38 of the cathode ray device.

The operation of this apparatus 28 and 35 is illustrated in Figs. 3, 4, 5 and 6. Referring to Fig. 3, for example, let it be supposed that the dash line curve $E_p$ represents the anode voltage supplied to the discharge device 48 and that the curve $E_g$ represents the alternating voltage supplied to the control electrode of the device 48. These voltages are in phase, the control electrode being positive when the anode is positive. However, because of the flow of current in the resistance 58, the voltage on the control electrode rises during the positive half cycle only slightly above the zero level and thus the anode current in the device 48 is of a value determined by the anode voltage. This anode current is represented by the curve $I_p$ in Fig. 3 rising and falling in a sinusoidal way during the positive half cycle and being substantially zero during the negative half cycle. Thus pulses of electromotive force appear on resistance 60 which are smoothed out by the filter 65, 66 to produce a substantially steady electromotive force between ground and the upper vertical deflection plate 29.

Of course, at the same time the voltage on the control electrode of the opposite discharge device 49 is opposite that on the anode and the situation is as represented in Fig. 6 where the control electrode voltage, which is represented by the curve $E_g$, is opposite in phase to the anode voltage represented by the curve $E_p$ with the result that substantially no anode current $I_p$ flows in the resistance 61. Thus the upper electrode of the pair 29 is more negative than the lower electrode producing a corresponding deflection of the cathode ray.

Fig. 5 represents the same situation represented by Fig. 6 except that the grid voltage $E_g$ is of smaller magnitude than in Fig. 6. This is the case when the remote object is nearer to the line of travel of the observing craft. A small anode current $I_p$ thus flows in the anode resistance during the positive half cycle of the anode voltage.

Fig. 4 represents the same situation but in which the grid voltage $E_g$ is still smaller than that represented in Fig. 5 and a substantial anode current flows in the discharge device.

Fig. 7 represents by curves 70 and 71 the voltage between each of the different electrodes 29 and ground, voltage, in these curves, being plotted as ordinates against angle of deviation of the scanning device from the line of travel of the craft as abscissa. Of course, the voltage of these electrodes varies in dependence both upon the relation between the change in voltage produced by the transformer 15, or 16, with change in orientation of the apparatus and upon the characteristics of the rectifying discharge device producing the respective voltage. The output voltage from the transformers 15 and 16 varies as a sinusoidal function of the angle of orientation, being zero when that angle is zero, that is, when the apparatus is oriented directly along the line of travel of the craft; and increasing to a maximum when it is directed at 90° away from the line of travel of the craft. Therefore, if the device be directed along the line of travel of the craft, then when the anode of each of the devices 48 and 49 is positive, the control electrode voltage is substantially zero, a substantial anode current flows in both resistances 60 and 61 thereby producing equal and like voltages on the two deflecting electrodes, these voltages having the value indicated by the point 72 at the intersection of the curves 70 and 71 of Fig. 7. If the angle of orientation be now varied from the line of travel in either direction, the anode current in one of the devices increases while that in the other device decreases with the result that the voltage between each of the two electrodes and ground varies in accord with the corresponding one of the curves 70 and 71. The rate of increase of anode current in the one device rapidly reduces in accordance with the right-hand portion of the curve 70, for example, because the grid cannot become substantially positive due to the flow of grid current in the grid resistor and saturation of the discharge device or a maximum anode current for the applied voltage is rapidly attained. On the other hand, the decrease in anode current in the opposite discharge device is very rapid in accordance with the right-hand portion of the curve 71 by reason of the increased negative bias on the control electrode during the half cycle when the anode is positive. Of course, at small angles of deviation the control electrode voltage increases rapidly in accordance with the sine wave function and then increases more slowly at the larger angles. At the same time, by reason of the shape of the anode current grid voltage characteristic of the discharge device, the change in anode current becomes more gradual or reduces with increase in the negative grid voltage. These two effects are thus accumulative to produce the rapid drop in grid voltage indicated by the right-hand portion of the curve 71 at small angles and the more gradual or reduced rate of drop of anode voltage as larger angles are approached.

Of course, the same action occurs when the orientation of the apparatus is varied in the opposite direction from the zero position or line of travel of the craft.

The voltage effective to produce deflection of the cathode ray is the voltage between the two deflecting electrodes of the cathode ray device; that is, it is the differential of the two rectified voltages produced by the discharge devices 48 and 49. This differential is the difference between the values represented by the two curves 70 and 71 for any angle of deviation and it is represented in Fig. 7 of the drawing by the curve 73. From this curve it will be seen that the voltage between the two electrodes is zero when the angle of orientation is zero with respect to the line of travel of the craft and that as the angle of orientation increases in either direction this voltage increases at first rapidly but at a progressively reducing rate. Of course, if the angle be in one direction from zero, the voltage represented by the curve 73 is of one polarity, while if the angle be in the opposite direction from the zero position, the voltage represented by the curve 73 is of opposite polarity. This is obvious from Fig. 7 since at one side of the zero position the curve 71 represents greater values of voltage than the curve 70, whereas at the opposite side of the zero position the reverse is true.

The curves of Figs. 3, 4, 5 and 6 may be taken to be those corresponding to points on the curve 71 of Fig. 7 represented by the crosses on that curve taken in the order from left to right respectively. Of course, these curves represent the conditions in a single one of the rectifying discharge devices, a similar set of curves being applicable to the opposite discharge device.

Of course, as previously mentioned, the apparatus for producing horizontal deflection operates in exactly the same way as that for producing vertical deflection and similar curves may be drawn to represent their operation. The result of the combined effects of these scanning voltages so derived applied to the vertical and the horizontal deflecting plates of the cathode ray device is to deflect the beam of the cathode ray device over the screen thereof in accord with the direction in which the scanning device is maintained oriented. It will be remembered that the scanning device is maintained oriented at any remote reflecting object, or source, of electromagnetic radiation to which the equipment responds. Thus the beam of the cathode ray oscillograph moves over the viewing screen in accord with the direction of the remote object.

It will be understood that while I have shown the control voltages applied to the control electrodes of devices 48 and 49 while fixed voltages are applied to the anodes, this is by way of illustrating the preferred arrangement and that the reverse of this condition may, if desired, be employed.

Figs. 8, 9 and 10 represent various indications which may be observed from the screen of the cathode ray device. In these figures various circles are shown corresponding respectively to the angle between the line of travel of the craft and the direction of orientation of the scanning device, in the vertical and horizontal planes, the inner circle corresponding to an angle of 1° and the other circles corresponding to angles of 2°, 4°, 8°, 16°, 32° and 90°, respectively, as designated in Fig. 8. Of course, these circles have the same significance in each of the other figures. They may or may not be indicated upon the viewing screen of the equipment.

In Fig. 8 the spot 39 produced by impingement of the cathode ray upon the viewing screen is indicative of a remote object substantially at an angle of 8° to the left of the line of flight of the craft and between 2 and 3 degrees above the line of flight. This spot also has short horizontally projecting wings 47, as noted in connection with Fig. 1, thus advising the pilot that the remote object is at a great distance away. The pilot may now turn his craft in the direction of the remote object and approach it with the result that the indication changes to that shown in Fig. 9 where the remote object is indicated at an angle slightly less than 2° from the line of travel, at the left, and about 1° above the line of travel. The horizontal projections 47 are now longer, indicating that the remote object has been approached. In Fig. 9 the spot 39 has moved directly to the center of the cathode ray screen, or to the intersection of cross hairs, if such be provided, indicating that the remote object is now directly forward and in the line of travel of the craft. The horizontal arms 47 are now long, indicating the close proximity between the observed and observing craft.

As appears from Figs. 8 to 10, small angles of deviation of the scanning device from the true line of travel of the craft produce wide movement of the spot 39 on the viewing screen, whereas when the angle of deviation is large, large changes therein produce only small movement of the spot. This is indicated by the fact that the large circles representing widely different but large angles are closely spaced in Figs. 8 to 10, whereas the smaller circles representing smaller angles are progressively more widely spaced. Thus the sensitivity of response of the equipment to change in the angle of deviation increases as the remote object approaches the line of travel of the craft.

It may occur in the operation of the apparatus, where it is desired to maintain the craft headed directly toward the remote object, that the sensitivity may be sufficiently great, when headed directly at the remote object, to render such operation difficult. It may then be desirable to reduce the sensitivity of the equipment to smaller angular deviations when the craft is headed directly toward the object. This may be done by operating switches 85 and 86 of Fig. 2 to their upper positions. These switches may if desired be arranged for unicontrol. This inserts resistances 87 and 88 in the circuits 26 and 27, respectively, thereby reducing the control voltage supplied to the rectifiers 28 and 35 thus reducing the response of that equipment to changes in the angle of deviation. The circles shown in Figs. 8, 9 and 10 may then correspond to angles of 4°, 8°, 12°, 20°, 28°, 40° and 90°, respectively, rather than the values designated in Fig. 8.

It will now be observed from the characteristics indicated in Fig. 7 that the indication of zero angle of deviation is not affected by any change in the magnitude of the operating voltage supplied to the terminals 24. That is, if this operating voltage increases or decreases, the curves 70 and 71 correspondingly rise and lower and their point of intersection merely rises or lowers along the vertical zero lines as indicated at H and L, the point H corresponding to the intersection of the curves if the voltage rises and the point L corresponding to the intersection of the curves if the voltage lowers. The indication, therefore, of this zero position, remains fixed and unaffected by such a change in operating voltage. The accuracy of the indication of angles of greater value is affected to some extent but this is not of serious importance since in the usual applications this change is not sufficiently great to affect these indications objectionably. It is, however, highly desirable that the indication of zero position be unaffected.

The means for producing the horizontal arms 47 suggestive of wings of an observed craft comprises the circuit 45 of Fig. 2, which includes a pair of diodes 75 and 76 to which high voltage is supplied from the circuit 25 and the potentiometer 13, 14, the portion of which in series with the applied voltage, is changed in accord with the range to the remote object, as previously explained. This voltage is supplied through transformer 77 having a secondary winding one terminal of which is connected to the cathode of diode 75 through a resistance 78 and to the anode of the other diode through a resistance 79. The opposite terminal of the secondary winding is connected to the cathode of the diode 76 and to the anode of the diode 75. A pair of condensers 80 and 81 is connected in series between the cathode of the diode 75 and the anode of the diode 76, the load device 46 being connected from a point between the two condensers 80 and 81 and the point between the two resistances 78 and 79.

In the operation of this circuit the two diodes are alternately conducting. When either diode conducts, it produces a potential on its respective resistance 78 or 79, which in turn charges the corresponding condenser 80 and 81. The time constant of each of these condensers and the respective resistance is such that this charge is held over between the conducting periods of the discharge device, leaking off only gradually through the respective resistance. The result is that the anode of each diode is biased negatively relative to its cathode by an amount dependent upon the magnitude of the impressed voltage and current flows through each diode only during a portion of the half cycle when its anode is positive, being zero for an interval at the beginning of the half cycle and for another interval just prior to the end of the half cycle. That is, current flows in the respective device only when the steady bias is overcome by the impressed alternating voltage. The duration of these intervals is substantially constant during variations in range to the remote object since the bias voltage automatically developed on the respective condenser increases in the same ratio as the impressed alternating voltage. Thus current pulses of the form indicated at 82 and 83 in Fig. 11 are produced across the resistance 46, these pulses being of alternate polarity and each pulse being shorter than a half cycle of the 400 cycle wave the successive pulses being spaced apart in time by periods of substantially zero current indicated at 84. As the range of the remote object decreases the contact arm 13 of Fig. 2 moves to the left applying a greater portion of the voltage on circuit 25 to the transformer 77 and the diodes with the result that the intensity of the pulses increases, the charge on the condensers 80 and 81 increases in the same ratio with the impressed voltage and the duration of the different pulses thus remains constant. Thus the wings 47 become extended in accordance with the range as the remote object approaches the observing craft.

This circuit 45 is particularly advantageous for the purpose described because of its simplicity. It employs only the two diodes which may be in a single envelope operating in the simple self-rectifying circuit shown. If desired, these diodes might be replaced by other suitable unilateral conducting devices, such as copper oxide rectifiers, operating in the same circuit thus obviating the need for cathode heating energy.

This device 45 is described and claimed in applicant's continuation application Serial No. 512,473, filed December 1, 1943, entitled Pulse generator, which has matured into Patent No. 2,411,212, dated Nov. 19, 1946, and which is assigned to the assignee of this present application.

Of course, in preparing the equipment for operation it is necessary that it first be adjusted to produce the indication of zero angle when the remote object is directly in the line of travel of the craft; that is, it must be adjusted so that the spot 39 appears at the intersection of the cross hairs when the remote object is directly in the line of flight of the craft. This adjustment may be effected by operating switches 89, 90, 91, 96 and 97, to the lower positions. The switches 89, 90 and 91 are included respectively in the control circuits for the equipments 28, 35 and 45 and operate to open those circuits and to short circuit the primary windings of the respective transformers 55, 55' and 77 thereby to prevent any voltage from the transformers 15 or 16 or from the equipment 9 affecting the indication produced. The short circuiting of these windings also prevents voltage being induced in the windings of these transformers by any stray fields that may exist. Similarly, switches 96 and 97 open the power supply circuits to the rectifiers 28 and 35 and short circuit the primary winding of their respective power supply transformers. Movable contacts 92 and 93 on respective potentiometers 94 and 95 are then adjusted, these potentiometers being connected across suitable sources of unidirectional potential which, for example, may be of 100 volts as indicated on the drawing. Contact 93 is connected through resistances 61 and 67 to the lower deflecting plate of the pair 29. The upper deflecting plate of this pair is connected through resistances 65 and 60 to the positive terminal of a source of unidirectional potential indicated at +50. This latter source may supply fifty volts, for example, with respect to ground to the upper vertical plate 29. Then by adjusting contact 93 on resistance 95 to a proper value, the ray of the cathode ray device may be brought to the center position in the vertical plane.

The horizontal plates 38 are connected in the same way with respect to the unidirectional potential sources indicated at +50 and +100 in the rectifier 35 and the ray may be adjusted to the center position in the horizontal plane by proper adjustment of contact 92 on resistance 94.

This adjustment having been effected, the switches 96 and 97 may then be returned to the position shown in the drawing. It may occur that when the switches 96 and 97 are returned to the position shown in the drawing the spot 39 moves away from the intersection of the cross hairs. If it moves in the vertical direction from the intersection of the cross hairs, it may be due to inequalities in the devices 48 and 49. Adjustment may be effected by varying the resistance 98 in the anode circuit of one of these devices to bring about equality of currents therein thereby restoring the point 39 to the intersection of the cross hairs. If the spot 39 moves horizontally, a similar adjustment may be effected by variation of the resistance 99 in the equipment 35. After this adjustment has been effected the switches 89, 90 and 91 may be returned to the position shown and the apparatus is in condition for operation.

In the lower right hand portion of the drawing is represented by rectangle 101 apparatus designated "Horizon circuit" on the drawing which, when switches 102 are in their right hand position, controls the cathode ray device 30 to produce on the screen thereof an indication corresponding to the horizontal. Such an indication may be represented by the dotted line 103.

While I have shown a particular embodiment of my invention, it will of course be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent in the United States is:

1. In combination, a directive radiant energy device carried by a moving craft, means to maintain said device oriented toward a remote source of radiation irrespective of the direction of travel of said craft, a viewing screen, means to produce a visible indication on said screen at a point corresponding to the orientation of said directive device relative to the direction of travel of said craft, and means to increase the degree of movement of said indication over said screen with respect to the movement of said directive device relative to said craft as the direction of orientation of said directive device approaches agreement with the direction of travel of said craft.

2. In combination, a directive radiant energy device carried by a moving craft, means to maintain said device oriented in the direction of a remote source of radiant energy irrespective of the direction of travel of said craft, means to generate a unidirectional voltage having a predetermined value when said direction of orientation agrees with the direction of travel of said craft, and means to vary said voltage from said value at a progressively decreasing rate as said direction of orientation departs from said direction of travel and in a direction corresponding to the direction of said departure.

3. In combination, a directive radiant energy device carried by a moving craft, means to maintain said device oriented in the direction of a remote source of radiant energy irrespective of the direction of travel of said craft, means to generate a unidirectional voltage having a predetermined value when said direction of orientation agrees with the direction of travel of said craft, means to vary said voltage from said value at a progressively decreasing rate as said direction of orientation departs from said direction of travel and in a direction corresponding to the direction of said departure, a cathode ray device, and means to deflect the ray of said device in accord with said unidirectional voltage.

4. In combination, a directive radiant energy scanning device located substantially on the axis of intersection of two planes and capable of angular orientation toward a remote source of radiant energy, means comprising said device and responsive to radiant energy from said source to maintain said device oriented toward said source of energy irrespective of angular movement therebetween relative to either of said intersecting planes, means responsive to angular movement of said directive device with respect to either of said planes to generate respective unidirectional voltages having polarities and magnitudes dependent upon the direction and extent of said movement, said voltages being zero when the direction of orientation of said device lies along the intersection of said planes, means responsive to said angular movement to increase each of said voltages at first rapidly and then at progressively decreasing rates as said direction of orientation departs from said intersection and indicating means responsive to said voltages to indicate the direction of orientation of said device.

5. In combination, a directive radiant energy scanning device located substantially on the axis of intersection of two planes and capable of angular orientation toward a remote source of radiant energy, means comprising said device and responsive to radiant energy from said source to maintain said device oriented toward said source of energy irrespective of angular movement therebetween relative to either of said intersecting planes, means responsive to angular movement of said directive device with respect to either of said planes to generate respective unidirectional voltages having polarities and magnitudes dependent upon the direction and extent of said movement, said voltages being zero when the direction of orientation of said device lies along the intersection of said planes, means responsive to said angular movement to increase each of said voltages at first rapidly and then at progressively decreasing rates as said direction of orientation departs from said intersection, a cathode ray device having a viewing screen, and means controlled by said voltages to deflect the ray of said device over said screen in respective intersecting directions corresponding to said planes thereby to produce a visible indication on said screen of the location of said remote source, said indication moving rapidly in response to said departure in the neighborhood of said intersection and more slowly in regions of the screen removed therefrom.

6. In combination, a radio scanning device capable of orientation in a predetermined plane at different angles relative to a fixed direction, a pair of electron discharge devices, each of said devices having an anode, a control electrode, and a cathode, means to supply first alternating voltages to both said anodes in phase with a reference voltage, means to supply to said control electrodes second alternating voltages of the same frequency as said last mentioned voltage, means responsive to the angular deviation of said scanning device from said fixed direction in one sense to maintain one of said second voltages in phase with said reference voltage and the other out of phase with said reference voltage, and to reverse the phase of both said second voltages for deviations in the opposite sense, and means to vary the magnitudes of both said second voltages in accordance with the extent of said deviation, whereby oppositely varying anode currents flow in said discharge devices, a cathode ray device, and means to deflect the ray of said device in accord with the differential of said currents.

7. In combination, a directive radio device capable of orientation in a predetermined plane at different angles to a fixed direction, a pair of electron discharge devices, means to supply alternating voltage to each device in phase and to supply additional alternating voltage of the same frequency to each device in opposite phase, means to reverse the phase of one of said alternating voltages supplied to each device in accord with the position in orientation of said radio device, whereby the currents in said discharge devices vary oppositely with change in orientation of said radio device, a cathode ray device and means to deflect the ray of said device in accord with the differential of currents in said two discharge devices.

8. In combination, a directive radio device capable of orientation in a predetermined plane, at different angles to a fixed direction, a pair of electron discharge devices, means to supply alternating voltage to each device in phase and to supply additional alternating voltage of the same frequency to each device in opposite phase, means to increase the intensity of one of said alternating voltages applied to each device with increase in deviation of orientation of said radio device from said fixed direction, and to reverse the phase thereof in response to change of orientation of said radio device through said direction whereby the currents in said discharge devices vary oppositely in response to change in orientation of said radio device, a cathode ray device, and means to deflect the ray of said device in accord with differences in currents in said discharge devices.

9. In combination, a directive radio apparatus arranged for orientation, a cathode ray device, means to deflect the ray of said device in accord with the orientation of said apparatus, said means comprising a pair of electron discharge devices, each having an anode, a cathode and a control electrode, a source of alternating voltage subject to variation, means to supply said voltage to said anodes in phase and to said control electrodes in opposed phase, means to increase the intensity of voltage supplied to said control electrodes from a predetermined value in response to deviation of orientation of said apparatus from a predetermined position and to reverse the phase thereof in response to variation of said orientation through said position, and means to deflect the ray of said cathode ray device in accord with the differential of the anode currents flowing in said electron discharge devices whereby the position of said ray is unaffected by variations in said voltage.

10. In combination, a directive radio antenna carried by a moving craft, means to maintain said antenna oriented at a remote source of radio energy irrespective of the direction of movement of said craft, means to generate an alternating voltage having zero value when said antenna is oriented along the line of movement of said craft and having magnitude and phase varying respectively with the extent and direction of deviation of said orientation from said line of movement, a cathode ray device, and means responsive to said alternating voltage to produce a visible indication at a point on said cathode ray device corresponding to the orientation of said scanning device relative to the line of movement of said craft, and moving in either direction in accord with the angle between the direction to said source and the direction of motion of said craft.

11. In combination, an antenna arranged for orientation, a pair of electron discharge devices each having a control electrode, an anode, and a cathode, a source of alternating voltage, means to supply said voltage to said anodes in phase and to said control electrodes in opposite phase, and means mechanically coupled to said antenna to vary said voltage supplied to said control electrodes in sinusoidal relation to the orientation of said antenna whereby said voltage is zero at one position of orientation of said antenna and reverses in phase when said orientation moves through said position, and means responsive to current in said anodes to produce a steady unidirectional voltage of magnitude and polarity dependent upon the orientation of said antenna relative to said position whereby said voltage varies rapidly with variation in said orientation in the neighborhood of said position and at progressively decreasing rate as said orientation departs from said position.

12. In a radio echo apparatus, a cathode ray device having a viewing screen, means to orient said apparatus in different planes and to deflect the ray of said device in corresponding directions thereby to produce upon said screen an indication moving in accord with changes in orientation of said apparatus in said different planes, pulse shaping means, means to supply alternating electromotive force to said pulse shaping means varying in inverse accord with the range from which echoes are received, said pulse shaping means including means to convert said alternating electromotive force to pulses of opposite polarity spaced apart in time and increasing in amplitude with reduction in range, and means to control the deflection of said ray in one of said directions in accordance with said pulses.

13. In a radio echo apparatus, a cathode ray device having a viewing screen, means to orient said apparatus in different planes and to deflect the ray of said device in corresponding directions thereby to produce upon said screen an indication moving in accord with changes in orientation of said apparatus in said different planes, pulse shaping means, means to supply alternating electromotive force to said pulse shaping means varying in inverse accord with the range from which echoes are received, said pulse shaping means including means to convert said alternating electromotive force to pulses of opposite polarity spaced apart in time a constant amount during variation in said range, and means to control the deflection of said ray in one of said directions in accord with said pulses.

14. In combination, a radio echo apparatus arranged for orientation in different planes, a cathode ray device having a viewing screen, means to orient said apparatus in different planes and to deflect the ray of said device in different directions in accord therewith, thereby to produce a spot of light moving over said screen in accord with changes in orientation of said apparatus, a circuit, means to produce alternating electromotive force across said circuit varying in intensity with changes in the range from which echoes are received in said apparatus, a pair of unilateral conducting devices connected across said circuit in opposite sense, means to bias the anode of each of said devices negatively relative to its associated cathode by an amount increasing with decreases in said range but increasing more slowly than increases in said electromotive force, whereby pulses of current flow in said devices during respective half cycles of said alternating electromotive force increasing in intensity as said range increases, and means to deflect said ray in opposite directions in one plane in accord with said pulses in said unilateral conducting devices.

RAYMOND C. LOCKE.

REFERENCES CITED

The following references are of record in the file of this patent:

UNITED STATES PATENTS

| Number | Name | Date |
|---|---|---|
| 2,037,565 | Dozier | Apr. 14, 1936 |
| 2,138,966 | Hafner | Dec. 6, 1938 |
| 2,216,707 | George | Oct. 1, 1940 |
| 2,227,598 | Lyman et al. | Jan. 7, 1941 |
| 2,231,929 | Lyman | Feb. 18, 1941 |
| 2,308,752 | Hadfield | Jan. 19, 1943 |
| 2,309,525 | Mohr | Jan. 26, 1943 |

FOREIGN PATENTS

| Number | Country | Date |
|---|---|---|
| 503,471 | Great Britain | Apr. 6, 1939 |